Patented Dec. 15, 1936

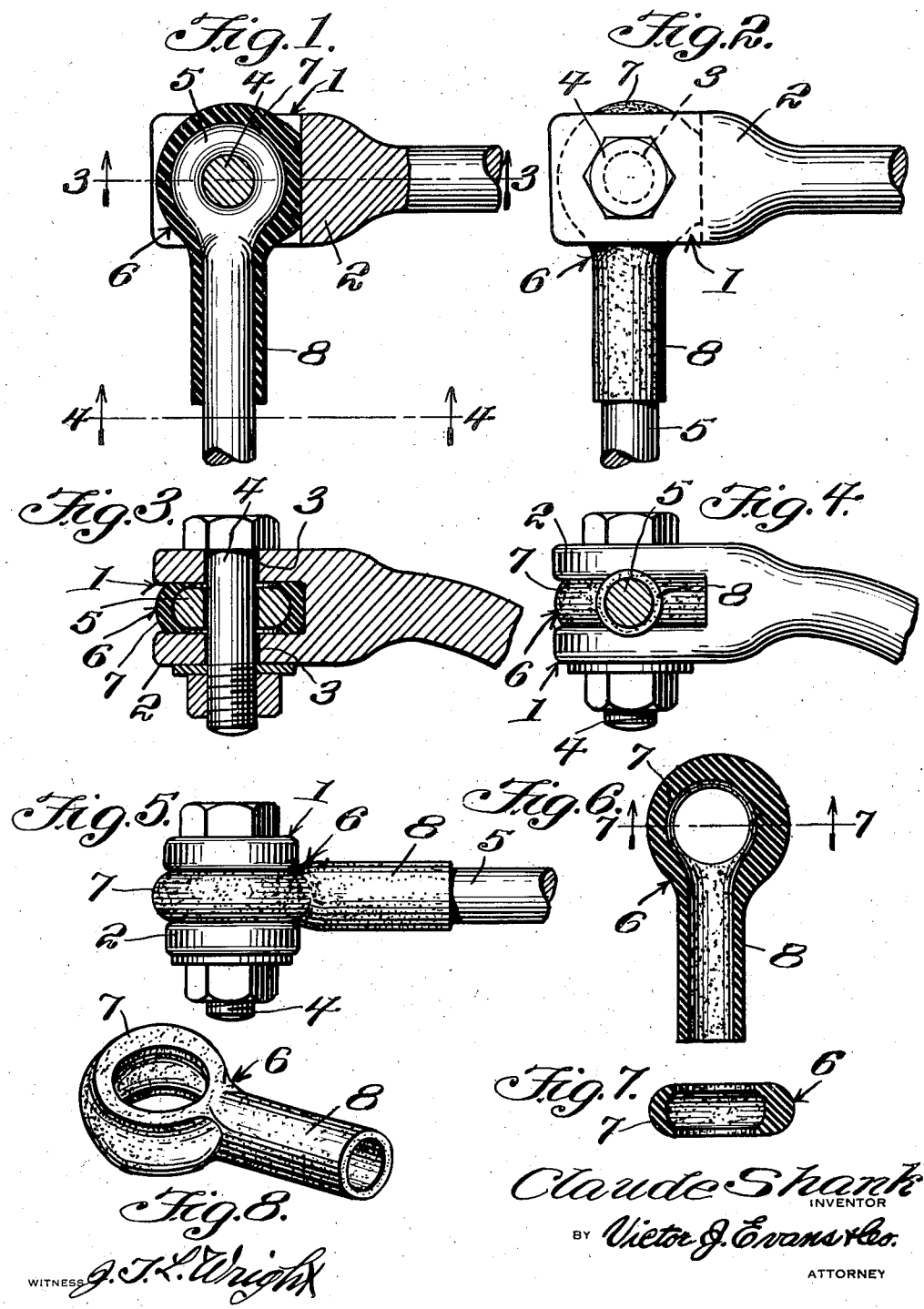

2,064,692

UNITED STATES PATENT OFFICE 2,064,692

BRAKE ROD CUSHION

Claude Shank, Goshen, Ind., assignor of one-half to Jesse R. Bruce, Goshen, Ind.

Application November 12, 1935, Serial No. 49,401

2 Claims. (Cl. 287—100)

This invention relates to brake rod cushions and has for the primary object the provision of a device of this character which will be inexpensive to manufacture and, therefore, may be sold at a low cost and may be readily adapted to a brake rod joint to prevent vibration of the joint and thereby eliminate noise.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary sectional view showing a brake rod joint equipped with a cushion constructed in accordance with my invention.

Figure 2 is a fragmentary plan view showing the same.

Figure 3 is a sectional view taken on the line 3—3 of Figure 1.

Figure 4 is a sectional view taken on the line 4—4 of Figure 1.

Figure 5 is a fragmentary side elevation illustrating the cushion applied to a joint of the brake rod.

Figure 6 is a sectional view showing the cushion.

Figure 7 is a sectional view taken on the line 7—7 of Figure 6.

Figure 8 is a perspective view illustrating the cushion.

Referring in detail to the drawing, the numeral 1 indicates a brake rod joint including a clevis-like portion 2 provided with aligned openings 3 to receive a bolt or like fastener 4. The bolt 4 pivotally connects to the clevis-like portion 2 and the eye-like portion 5. In a joint of the character described there is always a certain amount of play between the eye-like portions 5 and the clevis portion 2 as well as the bolt 4. This play causes vibration and noise and to eliminate both, my invention is employed and which consists of a cushion 6 fitting about the eye-like portion and bearing against the clevis portion 2 so as to prevent parts of the joint from rattling and vibrating. The cushion 6 is constructed of rubber or any other suitable material and includes an annular body portion 7 integral with a sleeve 8. The interior walls of the annular body are concaved to form a groove for the reception of the eye-like portions 5 of the joint. One side of the annular body is of an increased thickness to bear against one wall of the clevis portion 2, as clearly shown in Figure 1. The thickened wall is compressed when the joint is assembled thereby placing a desired tension on the parts of the joint to prevent vibration and noise. The sleeve 8 fits about the shank of the eye portion 5.

Having described the invention, I claim:

1. A cushion device comprising an annular-shaped body having an opening therethrough with the walls of said opening grooved, and a sleeve integral with said body portion and communicative with the opening.

2. A cushion device comprising an annular-shaped body having an opening therethrough with the walls of said opening grooved, a sleeve integral with said body portion and communicative with the opening, said body portion having a side thereof of an increased thickness.

CLAUDE SHANK.